March 31, 1970  J. MARTIN  3,503,571

INERTIA REEL DEVICES FOR SAFETY HARNESSES

Filed March 20, 1968  3 Sheets-Sheet 1

Inventor
JAMES MARTIN
By Kurt Kelman
AGENT

Inventor
JAMES MARTIN

United States Patent Office 3,503,571
Patented Mar. 31, 1970

---

3,503,571
INERTIA REEL DEVICES FOR SAFETY HARNESSES
James Martin, Southlands Manor, Southlands Road, Denham, near Uxbridge, Middlesex, England
Filed Mar. 20, 1968, Ser. No. 714,520
Claims priority, application Great Britain, Apr. 26, 1967, 19,229/67
Int. Cl. B65h 75/48
U.S. Cl. 242—107.4                                    5 Claims

---

ABSTRACT OF THE DISCLOSURE

This invention concerns an inertia reel device particularly suitable for use with safety harnesses in vehicle ejection seats, such device having a reel which becomes automatically locked against rotation when unwinding of a strap wound thereon causes an angular acceleration of the reel above a predetermined value, such automatic locking of the reel resulting from relative movement of balls disposed radially in slots around the inertia member, such inertia reel device conveniently including means positively to lock said reel against rotation in a strap unwinding direction when said device is subjected to an acceleration or deceleration in excess of a predetermined value.

---

This invention concerns inertia reel devices for safety harnesses of the kind in which a strap, cord, cable or the like (all hereinafter referred to as "straps") is connected at one end to, or forms, a harness and at the other end to a reel of said device.

One object of this invention is to provide an inertia reel device which more satisfactorily meets present day requirements and which is particularly suitable for use in aircraft ejection seats.

According to this invention there is provided an inertia reel device comprising a reel adapted to have one end of a strap secured thereto and to have a portion of such strap wound therearound, such reel being mounted for rotary movement to permit winding-up or unwinding of the strap, means associated with the reel which prevents unwinding of the strap when the latter is moved in an unwinding direction to cause an angular acceleration of the reel above a predetermined value, said means comprising an inertia member positioned at least partially within said reel and substantially coaxial therewith, said inertia member being coupled to the reel by at least two balls disposed radially around said inertia member and each ball lying partially within a recess in said reel and in a recess in said inertia member, the longitudinal axes of the recesses in the reel and member for each said ball lying at an angle to one another so that relative movement between the reel and the inertia member about their common axes of rotation results in movement of the inertia member along its axis of rotation, said inertia member carrying a plurality of teeth adapted to engage mating teeth when such inertia member moves along its axis of rotation, said mating teeth being restrained against rotational movement, and spring means being provided to urge said inertia member away from said mating teeth.

According to one feature of this invention said mating teeth may be provided on a sleeve which, whilst being restrained against rotational movement, is free to move towards said inertia member against the action of said spring.

According to another feature of this invention means may be provided for positively rotating said reel in a strap winding-up direction, said means advantageously comprising a linearly movable rack engaging a pinion.

According to a still further feature of this invention, said reel (or a part movable therewith) may carry teeth adapted to be engaged by a pawl, such pawl being provided positively to lock the reel against movement in a strap unwinding direction, irrespective of the position of the inertia member with respect to said non-rotatable mating teeth.

Very conveniently said pawl may be associated with a secondary inertia sensitive mechanism which automatically moves said pawl into engagement with said teeth when the inertia reel device is subjected to an acceleration or deceleration in at least one general direction in excess of a predetermined value.

Preferably said secondary inertia mechanism may comprise a weight pivotally carried by said inertia reel device and is connected to an over-dead centre spring toggle linkage arrangement which either urges said weight into a first position where the pawl is out of engagement with said teeth or into a second position where said pawl engages said teeth.

According to yet another feature of this invention said reel may be spring-biassed in a strap winding-up or retracting direction.

In a preferred embodiment said inertia reel device may conveniently comprise a pair of reels carried by a common spindle, one of such reels being associated with said inertia member and one of the reels being provided around its periphery with said teeth for engagement by said pawl.

Advantageously a single rack may be provided for causing rotation of both reels, said pinion which is engaged by said rack causing rotation of the spindle through appropriate gearing, the arrangement of such gearing being chosen so that the movement of the rack is geared up and the reels rapidly rotate for a relatively short slow travel of the rack.

In order that the invention may be more readily understood, and further features of the same more fully appreciated, one embodiment of inertia reel device suitable for use in aircraft ejection seats, will now be described by way of example and with reference to the accompanying drawings in which.

Figure 1:
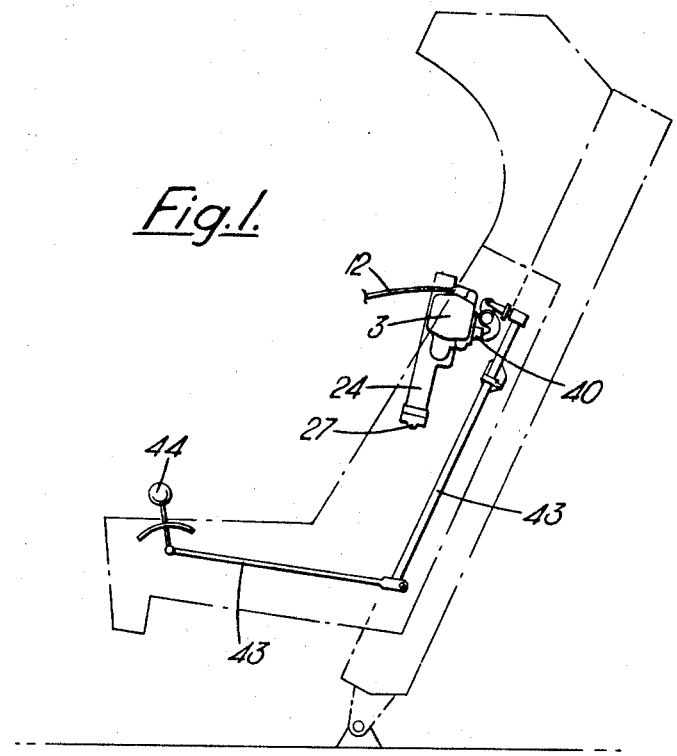
FIGURE 1 shows diagrammatically in side elevation, in dot-and-pic lines an ejection seat, the inertia reel device being shown attached to such seat in full lines.

In this embodiment the inertia reel device comprises a generally cylindrical body 1 having a pair of end walls 2, 3 each of said end walls 2, 3 being recessed centrally to house roller bearings 4, 5 for supporting, for rotation, the opposite ends of a spindle 6 upon which are mounted a pair of spaced apart reels 7, 8. The reels 7, 8 are rigidly secured to the spindle 6 toward opposite end portions of the latter and the central or intermediate portion of the spindle lying between the reels is further supported by a roller bearing 9.

Extending around said spindle to one side of the reel 7 is a spring 10, one end of this spring 10 being connected to the reel 7 and the other end being secured to the body 1 of the device. The spring 10 is arranged continually to urge the spindle 6 and the reels 7, 8 to rotate in one direction. Each of the reels is adapted to receive a length of strap 11, 12, one end of each strap being secured to the respective reel 7, 8 whilst the other end of each strap is adapted to pass through a slot in the wall of the body 1 of the device to a position where it is secured to the seat harness of an airman occupying the seat. In this particular arrangement such straps 11, 12 would be secured adjacent the shoulders of the airman seated in the seat. The spring 10 is, in fact, arranged to urge said reels 7, 8 in a strap winding-up direction.

The reel 8 of the device is provided with an annular recess 13 in which is positioned an inertia member 14 comprising an annulus which lies within said recess, such annulus 14 being provided with three separate circumferential grooves 15 within each of which lie a ball-bearing 16, such ball-bearing 16 being engaged respectively in three corresponding helically disposed circumferential grooves 17 provided in the adjacent surface of the reel 8.

The face of the annulus forming the inertia member 14 which lies remote from the reel 8 is provided with a ring of teeth 18 which face a corresponding ring of teeth 19 carried on the face of a radially disposed flange 20 extending from one end of a cylindrical sleeve 21 which lies around the common spindle 6 between the two reels 7, 8 and adjacent said roller bearing 9. The sleeve 21 and flange 20 is mounted about the spindle 6 so that it may move axially of the length of the spindle 6 toward said annulus 14 but is prevented from rotational movement about such spindle 6, stops 22 being provided on the flange to limit the extent of axial movement.

The annulus constituting the inertia member 14 and the sleeve 21 and flange 20 are urged away from one another by a helical compression spring 23 positioned around the common spindle 6.

Positioned as an extension of the housing 1 is a cylindrical chamber 24 in which is positioned a rack 25, such rack being positioned substantially tangentially but spaced radially away from the common spindle 6 and being mounted for axial movement linearly in said chamber 24 by pressure fluid, such rack 25 carrying a piston 26 which engages the wall of the chamber 24 which effectively constitutes a cylinder. A pressure fluid inlet is provided at the piston end of the chamber and such inlet is designated 27.

The rack 25 engages a pinion 28 carried by a supplementary spindle 29 which rigidly carries a larger pinion 30 with more teeth. Such further pinion 30 engages a still further pinion 31 carried in appropriate bearings 32 on a separate lay shaft 33 and this still further pinion meshes with teeth 34 provided on said spindle 6.

The pinions 28, 30, 31, and teeth 34 are arranged so that movement of the rack 25 is up-geared by said pinions and a relatively short movement of the rack 25 will result in substantial rotation of both reels 7, 8.

The rack 25 and pinion 28 arrangement is provided for forcibly retracting the straps on to the reels and this provision is made so that, on ejection of an ejection seat fitted with such an inertia reel device, the airman can automatically be correctly positioned in his seat prior to ejection in response to automatic introduction of pressure fluid into the chamber 24 through inlet 27.

It will be appreciated from the above description that slow withdrawal of the straps 11, 12 from the reels 7, 8 will merely result in rotation of the reels 7, 8 and rotation of the inertia member 14 with the reel 8. On the other hand, it will be appreciated that rapid strap withdrawal, that is withdrawal which results in the reels being subjected to an angular acceleration in excess of a predetermined value (which is determined by the strength of the helical compression spring 23 urging said rings of teeth 18, 19 away from one another), will result in the inertia member 14 lagging behind the reel 8, with the result that relative movement will result between the reel 8 and the inertia member 14 and the balls 16 will be forced to move along the helical grooves 17 in the reel 8 so that the inertia member 14 will move axially toward, and the teeth 18 will engage, the teeth 19 carried by the flange 20 which is restrained against rotation. In consequence, whenever the straps 11, 12 are withdrawn from the reels 7, 8 at a rate sufficient to result in said angular acceleration exceeding said predetermined value, the teeth 18 of the inertia member 14 will engage the fixed teeth 19 of the flange 20 and further rotation of the reels 7, 8 in a strap-unwinding direction will be prevented.

It will be understood that, if at the time of rapid withdrawal of the straps 11, 12 from the reels 7, 8 said inertia reel device was subjected to a force which would tend to encourage separation of the inertia member 14 from the flange 20 carrying the fixed teeth 19, then it is conceivable that automatic locking of the reels 7, 8 by the inertia member 14 might momentarily be delayed. It is for this reason that the sleeve 21 carrying the flange 20 and teeth 19 which are prevented from rotating is permitted to move axially of the spindle 6 so that, if such inertia reel device is subjected to such a force, the fixed teeth 19 will themselves move under the inertia of the sleeve 21 and flange 20 towards the inertia member 14 against the action of the helical compression spring 23 and in this way obviate any such momentary delay in locking.

This particular embodiment of device has been designed for use in aircraft ejection seats and it is desirable to ensure that the device is positively locked so that unwinding of the straps from the reels is impossible, even at slow rates, at least whilst ejection of the seat is actually taking place. Thus, a secondary locking mechanism is provided which is not sensitive to angular acceleration of the reels 7, 8 as a result of withdrawal of the straps 11, 12 therefrom but is sensitive to accelerations acting upon the inertia reel device as a whole.

Figure 3:
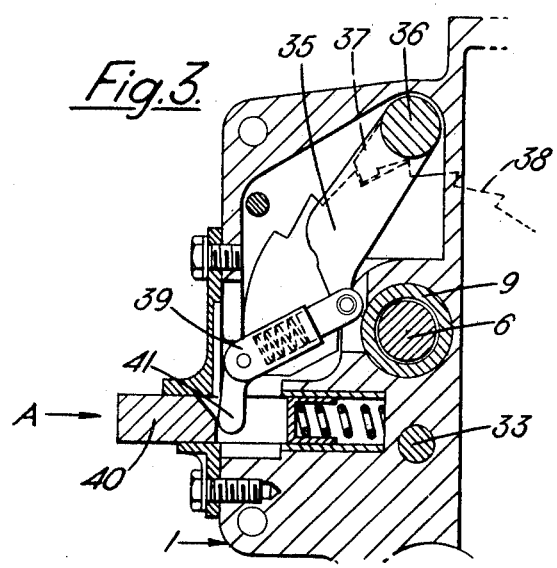
FIGURE 3 is a fragmentary sectional view of a part of the device showing a reel locking detent in an alternative position to the position shown in FIGURE 2.
Figure 4:
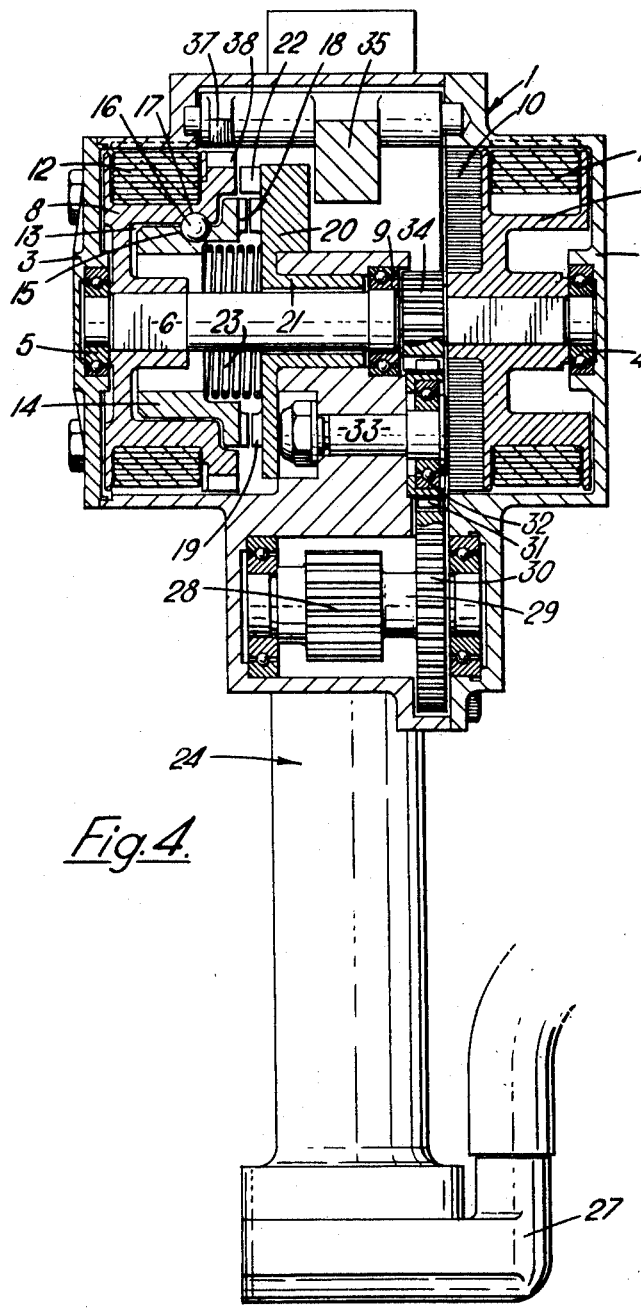
FIGURE 4 is a section on the line IV—IV of FIGURE 2.

This secondary inertia mechanism comprises an inertia weight 35 pivotally connected to the body of the inertia reel device by a shaft 36, such shaft 36 carrying a pawl 37 which is movable with the inertia weight from an unlocking position (shown in FIGURES 2 and 4) into a locking position (shown in FIGURE 3) in which the pawl 37 engages one of a plurality of teeth 38 positioned on the periphery of the reel 8.

Figure 2:
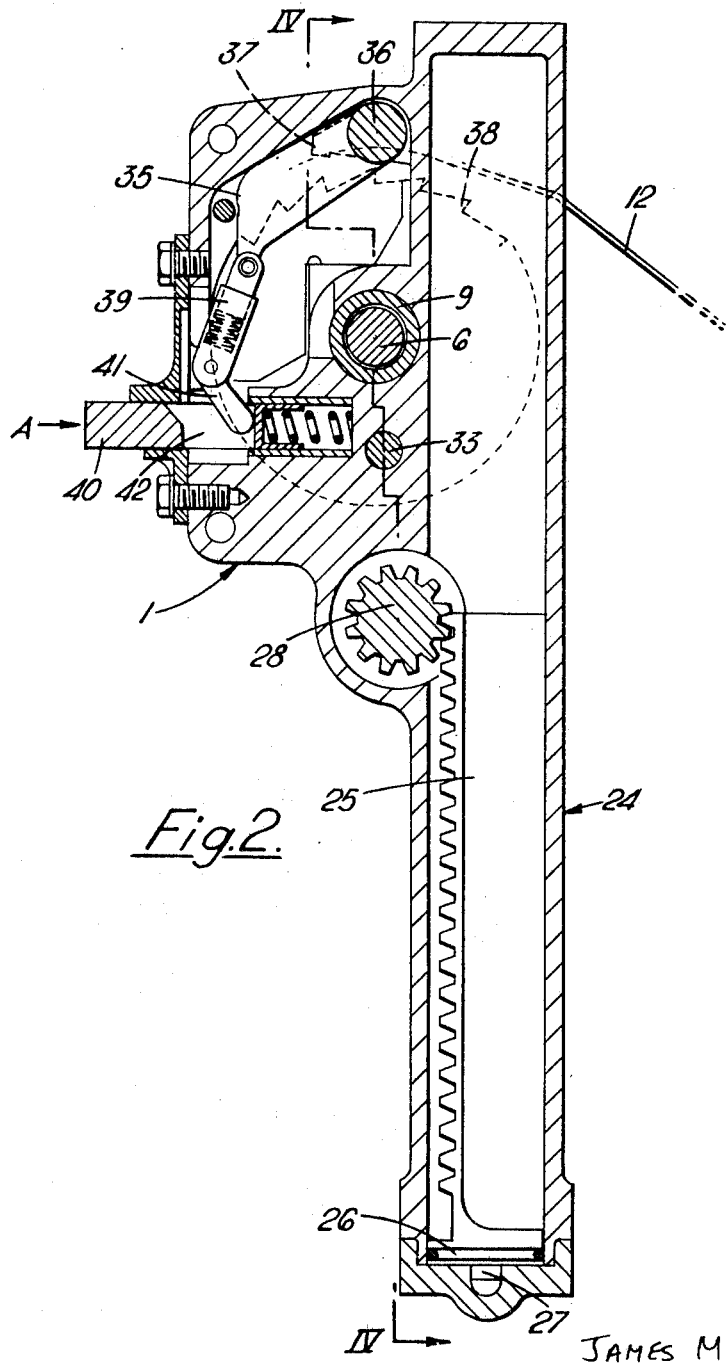
FIGURE 2 is a vertical section through the inertia reel device.

The weight 35 is connected to a spring cartridge 39 at a position remote from its pivotal connection to the body and this spring cartridge which comprises a pair of telescoped links having a compression spring urging the same apart forms, in conjunction with a spring-biassed plunger 40, an over-dead centre toggle arrangement which urges the weight 35 and the pawl 37 into either one of two positions, namely a first position in which the pawl 37 is in engagement with the teeth 38 on the reel 8 (see FIGURE 3) or a second position in which the pawl 37 is out of engagement with such teeth 38 (see FIGURE 2). It should be noted that, if desired, both reels may carry teeth 38 and two pawls 37 may accordingly be provided.

The link of the spring cartridge 39 remote from the inertia weight carries a lever 41 which engages in a slot 42 in said plunger 40 and, if this plunger is moved in the direction of the arrow A (FIGURES 2 and 3), the spring cartridge 39 moves through a dead-centre position and, in consequence, moves the inertia weight 35 from either one of the two positions to the other of the two positions. Thus, if the weight is in the position where the pawl 37 is positively locking the reels 7, 8 against rotation (see FIGURE 3), axial movement of the plunger 40 in the direction of arrow A will cause the weight to move to the other position (see FIGURE 2) and the spring cartridge will retain such weight 35 and the pawl 37 in that position until the latter is acted upon by a force sufficient to overcome the action of the spring cartridge 39 whereupon the weight 35 falls into a position where the pawl 37 engages said teeth 38.

The plunger 40 is conveniently attached by appropriate control mechanism 43 to a manual control lever 44 on one side of the ejection seat in easy reach of an airman seated in such seat so that, should the secondary inertia mechanism operate during a flight, for example, as a result of violent manoeuvres producing a force sufficient to actuate the mechanism and to cause the weight 35 to move into a position in which the reels are locked, the airman can easily by means of such manual control lever reset the inertia weight 35 into a position where the pawl 37 is inoperative. It will be understood that the spring cartridge 39 will be set so that under normal flight conditions such weight would not normally move into a position where the pawl 37 locks the reels against rotation. Nevertheless such cartridge is set so that movement of the weight 35 and pawl 37 is ensured when ejection of the seat from the aircraft takes place. The provision of such manual control lever 44 further enables the airman to move the spring cartridge into a position in which the weight 35 is forced into a position where the pawl 37 engages the teeth 38 on the reel. This facility permits the airman positively to lock the reels against rotation whenever he so desires such as, for example, poor weather conditions and when he is aware that violent manoeuvres are likely, for example, in aerobatics. Positive locking of the reels may also be desirable when landing.

It will be understood that the mechanism 43 is shown only diagrammatically in FIGURE 1.

I claim:
1. An inertia reel device comprising
   (1) a reel having one end of a strap secured thereto and adapted to have a portion of said strap wound therearound,
      (a) the reel having a coaxial recess;
   (2) a body mounting the reel therein for rotary movement to permit winding up or unwinding of the strap; and
   (3) means associated with the reel for preventing unwinding of the strap by stopping the rotary movement of the reel in an unwinding direction when the angular acceleration of the reel exceeds a predetermined value, said reel stopping means including
      (b) an inertia member having a part positioned within the recess of the reel and the inertia member being substantially coaxial with the reel,
      (c) at least two balls each disposed in a groove radially around said inertia member part and each engaging an associated groove in the reel within said coaxial recess, the balls coupling the inertia member to the reel, and the longitudinal axes of the grooves for each of said balls lying at an angle to one another so that relative angular movement between the reel and the inertia member about their common axis of rotation results in movement of the inertia member along said axis,
      (d) a plurality of teeth carried by the inertia member,
      (e) mating teeth mounted axially adjacent the inertia member teeth and adapted to be engaged with the inertia member teeth upon axial movement of the inertia member towards the mating teeth,
      (f) means restraining the mating teeth against rotational movement in respect of the reel, and
      (g) spring means urging the inertia member axially away from the mating teeth.

2. An inertia reel device according to claim 1, further comprising a sleeve carrying the mating teeth, said sleeve being restrained against said rotational movement but freely movable axially towards the inertia member against the bias of the spring means.

3. An inertia reel device according to claim 1, further comprising another reel and a common spindle for said reels rotatably carried by said body, the reels being keyed to said spindle for rotation therewith within said body, and the inertia member being arranged between said reels.

4. An inertia reel device according to claim 1, wherein the radial distance between the grooves wherein each of said balls is disposed is constant.

5. An inertia reel device according to claim 1, further comprising a spindle for said reel rotatably carried by and in said body, the reel being keyed to the spindle for rotation therewith within the body, the inertia member part being an annular part extending into the coaxial reel recess and surrounding the spindle, a sleeve mounted on the spindle and held against rotation in respect thereto but axially movable thereon, the sleeve carrying the mating teeth, and said spring means being mounted on the spindle between the inertia member and the sleeve.

References Cited

UNITED STATES PATENTS

| 3,189,296 | 6/1965 | Wrighton et al. | 242—107.4 |
| 3,220,668 | 11/1965 | Martin | 242—107.4 |
| 3,241,883 | 3/1966 | Fontaine | 242—107.4 XR |
| 3,294,445 | 12/1966 | Tino | 242—107.4 XR |
| 3,343,763 | 9/1967 | Spouge | 242—107.4 |
| 3,386,683 | 6/1968 | Howland | 242—107.4 |

FOREIGN PATENTS 243,190   1/1960   Australia.

STANLEY N. GILREATH, Primary Examiner

W. H. SCHROEDER, Assistant Examiner

U.S. Cl. X.R.

244—122